United States Patent [19]

Raz

[11] Patent Number: 5,439,309
[45] Date of Patent: Aug. 8, 1995

[54] JOINT COUPLING

[76] Inventor: Danny Raz, 71 Beit Lehem, 35568 Haifa, Israel

[21] Appl. No.: 48,897

[22] Filed: Apr. 20, 1993

[51] Int. Cl.⁶ .............................................. G08B 23/00
[52] U.S. Cl. .................................... 403/316; 403/317; 403/340
[58] Field of Search ............... 403/339, 340, 341, 316, 403/317, 170, 171, 173, 174

[56]     References Cited
    U.S. PATENT DOCUMENTS

| | | | |
|---|---|---|---|
| 53,219 | 3/1866 | Fawcett | 403/340 |
| 709,400 | 9/1902 | Fitzpatrick | 403/341 |
| 867,312 | 10/1907 | Shutz | 403/341 |
| 925,293 | 6/1909 | Cheney | 403/340 |
| 1,003,973 | 9/1911 | Barrickman | 403/340 |
| 2,474,727 | 6/1949 | Denier | 403/340 |
| 2,863,685 | 12/1958 | Boyce | 403/341 |
| 3,220,757 | 11/1965 | Potter | 403/340 |
| 3,617,078 | 11/1971 | Valukonis | 403/341 |
| 3,827,814 | 8/1974 | Laurent et al. | 403/341 |
| 3,877,824 | 4/1975 | Jury | 403/174 |

FOREIGN PATENT DOCUMENTS

| | | | |
|---|---|---|---|
| 1333159 | 6/1963 | France | 403/341 |
| 1502148 | 10/1967 | France | 403/341 |
| 466232 | 5/1937 | United Kingdom | 403/341 |
| 2073840 | 10/1981 | United Kingdom | 403/339 |

*Primary Examiner*—Richard A. Bertsch
*Assistant Examiner*—Howard R. Richman
*Attorney, Agent, or Firm*—Mark M. Friedman

[57]     ABSTRACT

A joint coupling for axially connecting together a first joint and a second joint, which includes first and second joints each having a complementary member sized and shaped so that, when the joints are properly aligned, the complementary members form an overlap structure which is effectively a continuation of the first joint or the second joint, and a sleeve which is slidable over the overlap structure to secure the joint coupling. The inside surfaces of the sleeve are tapered, as are the outside surfaces of the overlap structure such that when the sleeve is slid completely over the overlap structure, the inside surfaces of the sleeve make full contact with the outside surfaces of the overlap structure to firmly secure the joint coupling. Two or more joints may be joined at any desired relative orientation by use of a hub which has complementary elements which can accommodate the complementary members of the joints. The joint couplings can be readily used to create complicated structures of virtually any desired shape.

6 Claims, 6 Drawing Sheets

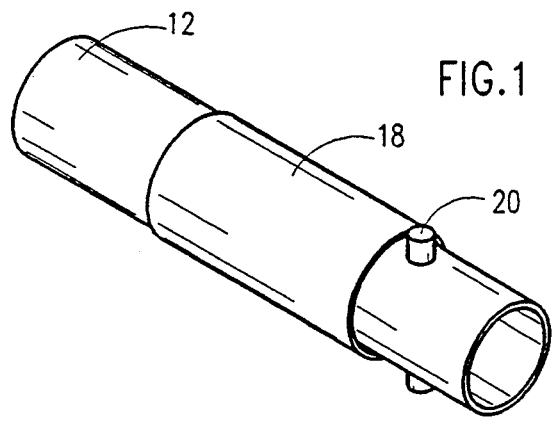
FIG.1
FIG.2
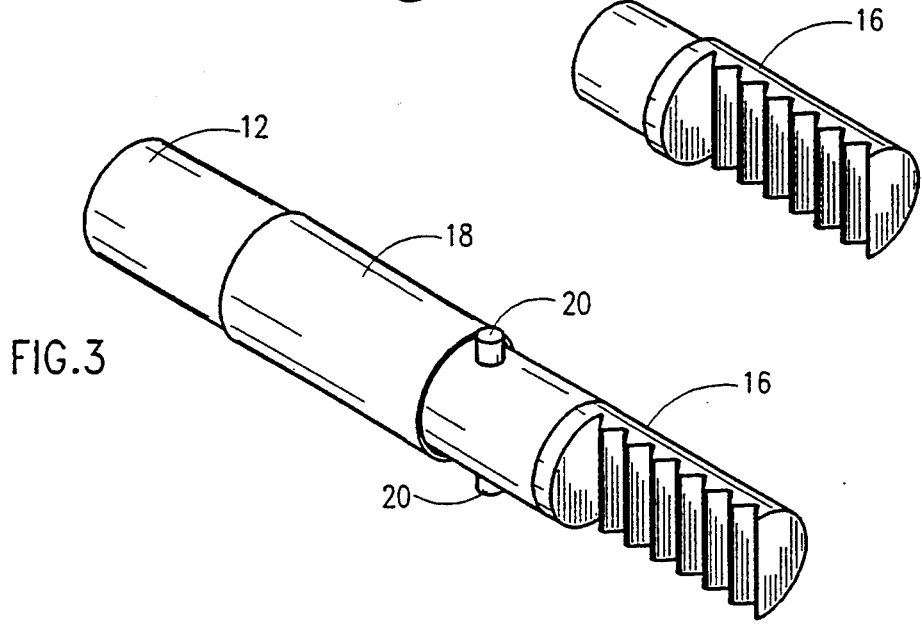
FIG.3
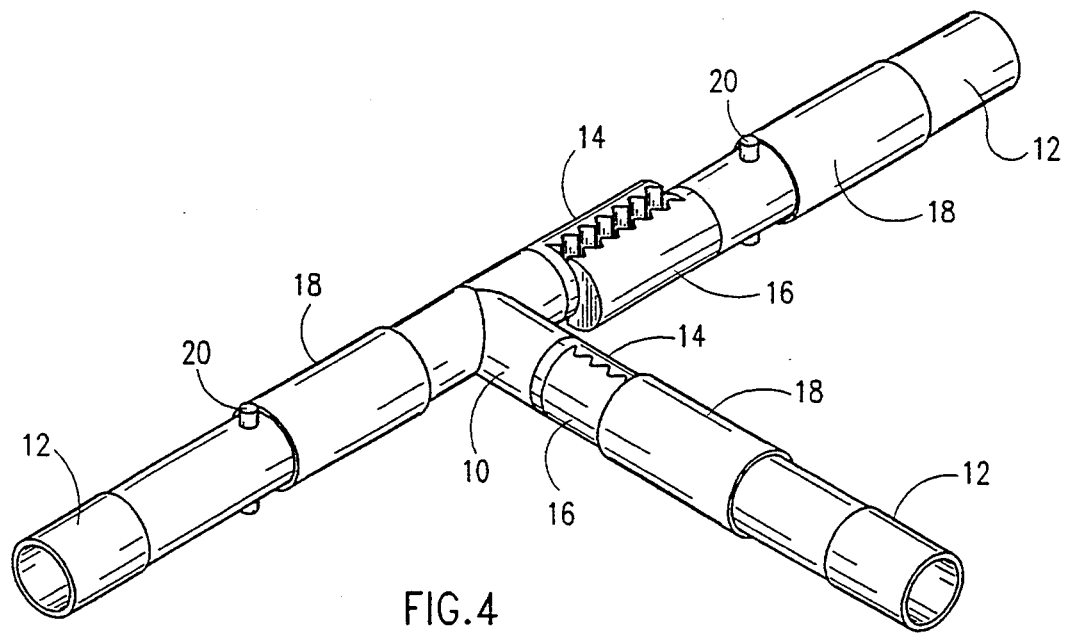
FIG.4

JOINT COUPLING

FIELD AND BACKGROUND OF THE INVENTION

The present invention relates to joint couplings and, more particularly, to ways of axially coupling a pair of joints.

In numerous applications it is required to axially couple, or connect, two structural members, such as rods, tubes, pipes, bars and the like (hereinafter referred to collectively as "joints"). One technique for coupling a pair of joints involves permanently welding the two members together, which calls for the use of specialized skills and equipment and which results in a monolithic structure which cannot readily be altered or disassembled.

In many applications it is desirable to use fasteners of various types to couple the joints. While such structures are more readily altered than welded structures, the coupling, and subsequent uncoupling, of the joints usually requires specialized tools and/or considerable strength as well as a certain amount of skill on the part of the worker.

There is thus a widely recognized need for, and it would be highly advantageous to have, ways of detachably and securely connecting a pair of joints which would be rapid and which could be effected manually without requiring the use of any tools or special skills, with disassembly possible without having to disconnect both ends of a joint, and which would result in a secure connection capable of withstanding vibrations, shocks and forces, both torsional and longitudinal, with the coupled joints acting substantially as if they were a single integral member.

SUMMARY OF THE INVENTION

According to the present invention there is provided a joint coupling for axially connecting together a first joint and a second joint, comprising: (a) a first complementary member connected to, or integrally formed with, the first joint; (b) a second complementary member connected to, or integrally formed with, the second joint, the first and second complementary members being sized and shaped so that, when properly aligned, the complementary members form an overlap structure which is effectively a continuation of the first joint or the second joint; (c) a sleeve slidable over the overlap structure so as to secure the joint coupling; and (d) a first depressible member and a second depressible member connected to, or integrally formed with, each other, the first and second depressible members being biased outwardly so as to prevent the sleeve from sliding off the second joint until the joint coupling is to be secured and to prevent the sleeve from sliding away from the overlap structure when the joint coupling is secured.

According to further features in preferred embodiments of the invention described below, the inside surfaces of the sleeve are tapered, preferably frusto-conically shaped, as are the outside surfaces of the overlap structure, such that when the sleeve is slid completely over the overlap structure, the inside surfaces of the sleeve make contact with the outside surfaces of the overlap structure to secure the joint coupling and form a positive connection.

According to still further features in the described preferred embodiments, the second joint further includes first means for preventing the sleeve from sliding away from the overlap structure when the joint coupling is secured and/or second means for preventing the sleeve from sliding off the second joint until the joint coupling is to be secured, preferably the second joint includes both first means and second means.

The present invention successfully addresses the shortcomings of the presently known configurations by providing a joint coupling which can be quickly and readily deployed and undone without the use of any tools and without requiring special skills. Joint couplings according to the present invention allow the joints to be firmly secured so that the play or give normally associated with such readily reversible couplings is absent.

BRIEF DESCRIPTION OF THE DRAWINGS

The invention is herein described, by way of example only, with reference to the accompanying drawings, wherein:

FIG. 1 is a perspective view of one portion of a joint coupling according to one embodiment of the present invention;

FIG. 2 is a perspective view of an insert which can be attached to the portion shown in FIG. 1;

FIG. 3 is a perspective view of the portion of the joint coupling when the member of FIG. 1 and the insert of FIG. 2 are united;

FIG. 4 is a perspective view of an assembly of joint couplings according to the present invention demonstrating several stages of the connection process;

DESCRIPTION OF THE PREFERRED EMBODIMENTS

Figure 5:
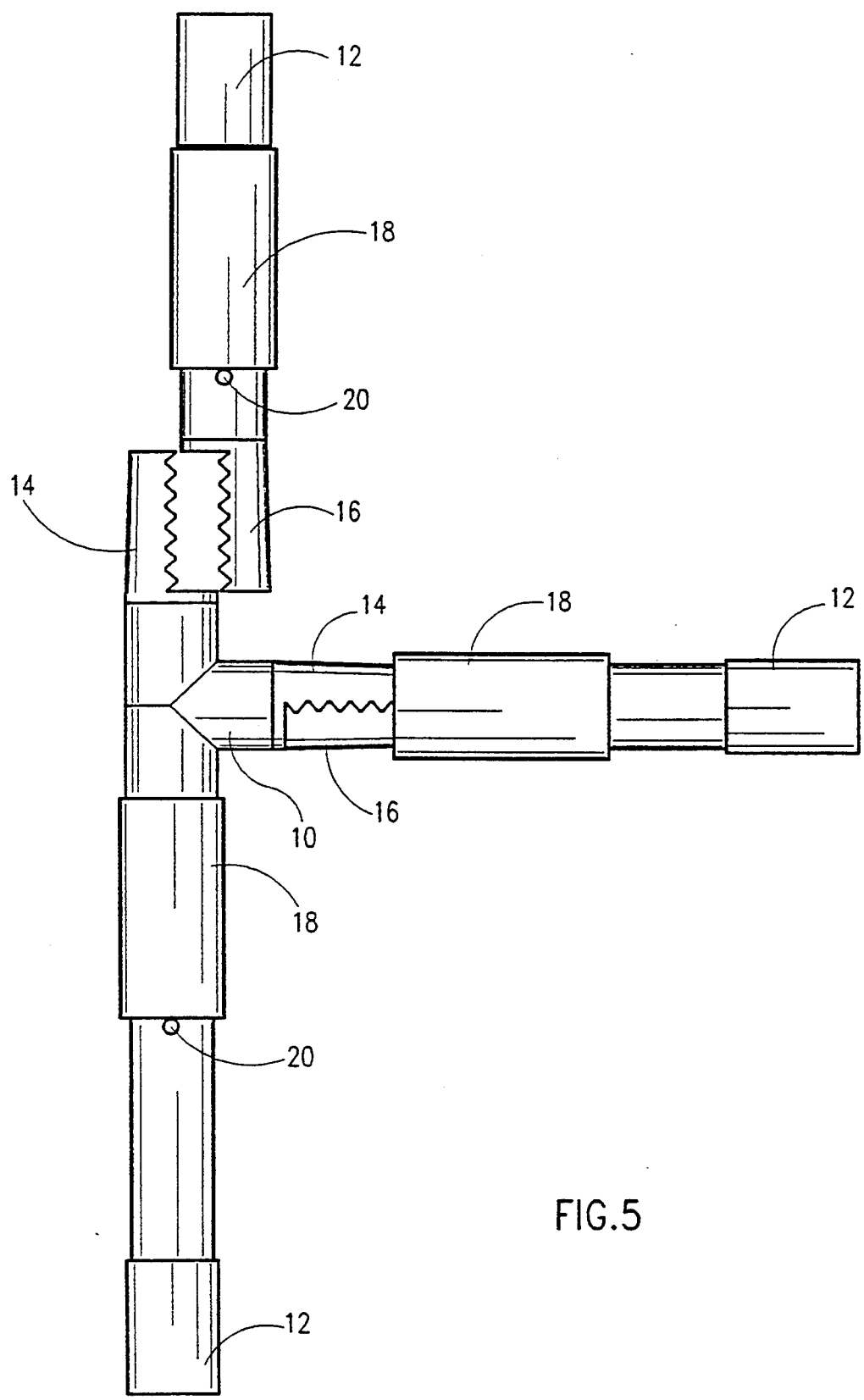
FIG. 5 is a plan view of the assembly of FIG. 4.

The present invention is of a joint coupling which can be easily deployed to firmly secure joints so as to form a monolithic and rigid structure of a large variety of shapes, and which can equally readily be disassembled. Both assembly and disassembly can be performed by unskilled personnel without the aid of any tools or appliances.

The principles and operation of a joint coupling according to the present invention may be better understood with reference to the drawings and the accompanying description.

Referring now to the drawing, FIGS. 1-4 illustrate in perspective, one embodiment of a joint coupling according to the present invention. A joint coupling according to the present invention can be used to securely join together two or more joints. It may, in some cases be desired to axially connect two joints directly to each other so as to effectively form single member of increased length. In other cases, it is desired to indirectly join the two (or more) joints so that the axes of the two (or more) joints form certain desired angles with each other. The latter couplings, which are those illustrated in the drawings, must be effected through the use of a suitable hub which forms a joint coupling with each of the two or more joints, as described below. In the description which follows, it is to be understood that joint coupling refers to the coupling of any two members or joints, regardless of whether both members or joints are actually joints of significant length or whether one or both members or joints is, in fact, a hub, as described below.

A joint coupling according to the present invention is designed to axially connect together a first joint 10 and a second joint 12, either or both of which may be a hub. The joint coupling includes a first complementary member 14 which is connected to, or is integrally formed with, first joint 10, and a second complementary member 16 which is connected to, or is integrally formed with, second joint 12.

Illustrated in FIG. 2 is an example of second complementary member 16 which is connectible, by any suitable means, to second joint 12 (FIG. 1) to form a monolithic unit (FIG. 3). It is readily appreciated that the structure of FIG. 3 could also be integrally formed.

First complementary member 14 and second complementary member 16 feature surfaces which are sized and shaped so that, when complementary members 14 and 16 are properly aligned, an overlap structure is formed which is effectively a continuation of first joint 10 and/or of second joint 12. Thus, as can be seen in the joint coupling depicted on the right side of FIG. 4, when complementary members 14 and 16 are properly aligned, they form a structure which has substantially the same dimensions as joints 10 and 12 being connected.

The complementary features of complementary members 14 and 16 can be of any suitable size and shape, preferably each of complementary members 14 and 16 includes at least one protrusion and at least one recession. Most preferably, each of complementary members 14 and 16 includes a plurality of protrusions and recessions, or teeth.

A joint coupling according to the present invention further features a sleeve 18 which is slidable over overlap structure formed by complementary members 14 and 16 so as to secure the joint coupling, as shown in the joint coupling in the lower portion of FIG. 4.

In preferred embodiments of joint couplings according to the present invention, the coupling further includes means for preventing sleeve 18 from sliding away from the overlap structure when the joint coupling is secured and preferably further includes means for preventing sleeve 18 from sliding off second joint 12 until the joint coupling is to be secured. Preferably, both functions are accomplished by one or more depressible members 20, which are described in more detail below.

Figure 6:
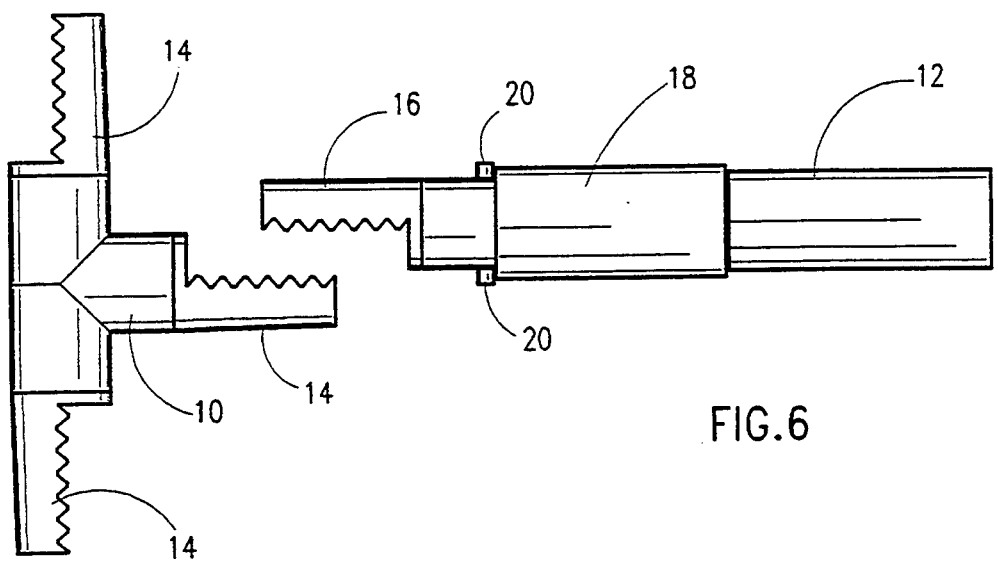
FIG. 6 is a plan view of the assembly of FIG. 4 before alignment of the coupling.

The principles and operation of a joint coupling according to the present invention can be further understood with reference to FIGS. 5 and FIGS. 6-8 which illustrate joint couplings in various positions. Shown in the upper portion of FIG. 5 and in FIG. 6 is a situation where complementary members 14 and 16 are misaligned and the coupling has not been effected.

Figure 7:
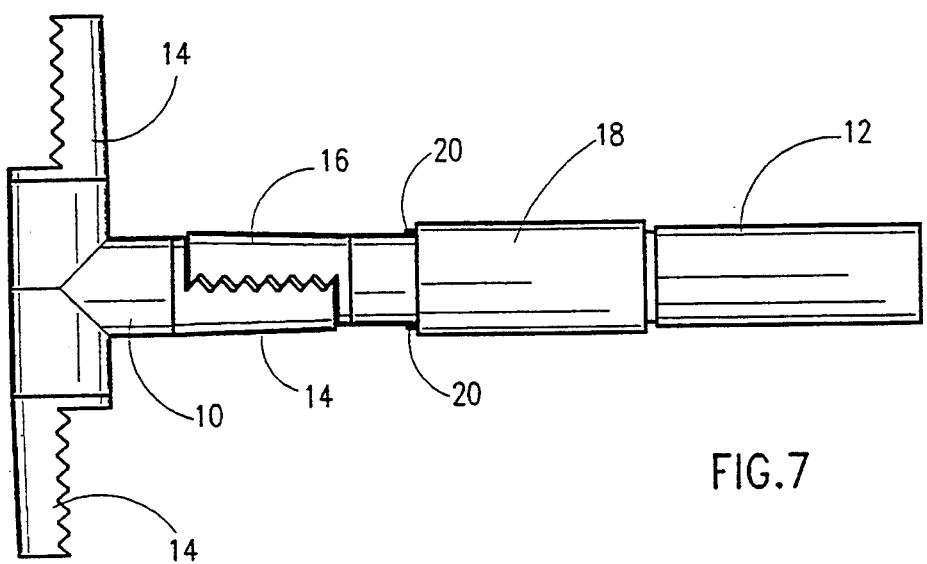
FIG. 7 is a plan view of the assembly of FIG. 4 with the coupling aligned and the sleeve having been moved slightly to the left.

In the coupling shown at the right of FIG. 5 and in FIG. 7, complementary members 14 and 16 have been brought into substantial alignment and sleeve 18 is starting to slide into position covering the overlap region formed by complementary members 14 and 16. In a preferred embodiment, in order to allow sleeve 18 to move toward the overlap region, depressible members 20 have been depressed sufficiently to allow sleeve 18 to move past them (FIG. 7).

Figure 8:
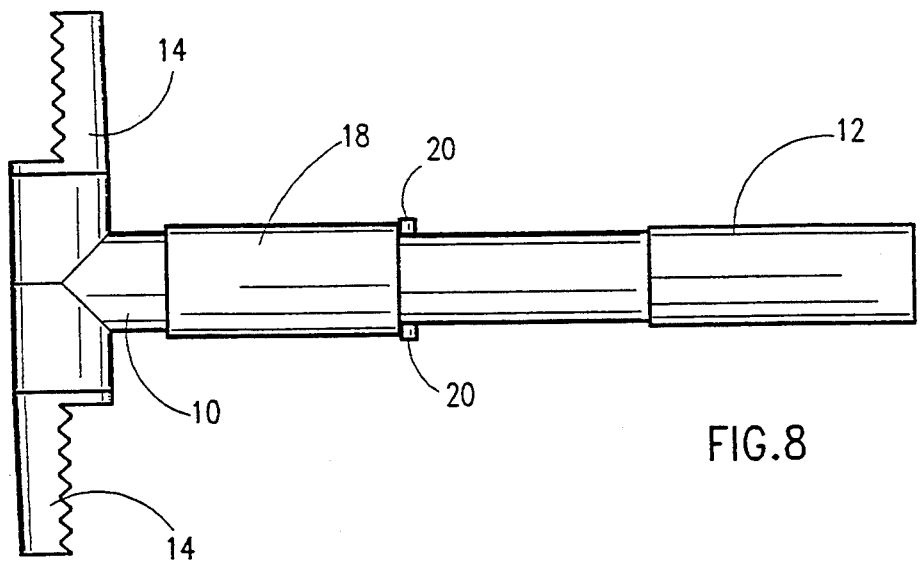
FIG. 8 is a plan view of the assembly of FIG. 4 after the sleeve has been completely moved to effect the joinder.

Shown at the lower portion of FIG. 5 and in FIG. 8 is the situation where sleeve 18 has been fully installed over the overlap region, at which point depressible members 20 return to their normal outwardly extended position and prevent sleeve 18 from inadvertently sliding off the overlap region and thereby causing the loosening of the coupling.

Figure 9:
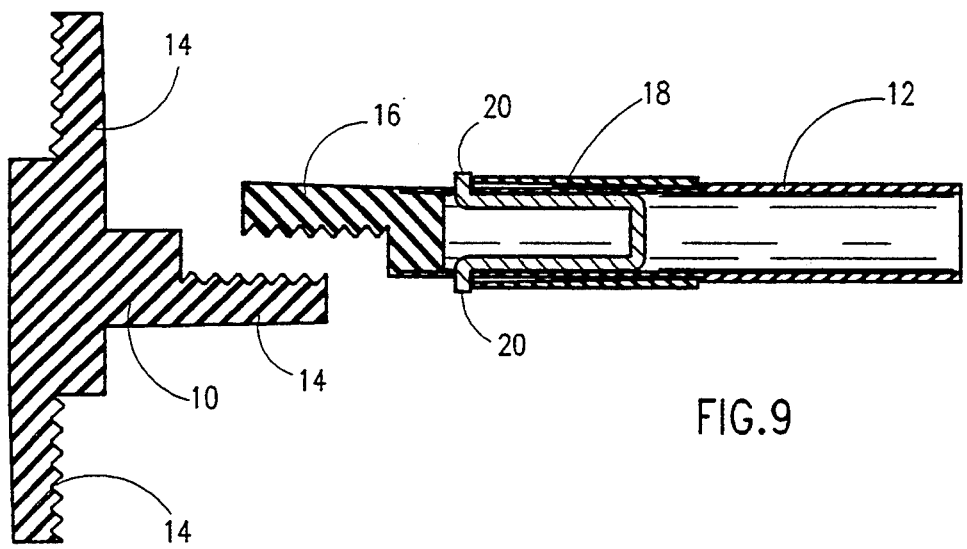
FIG. 9 is a plan cross sectional view corresponding to FIG. 6.
Figure 10:
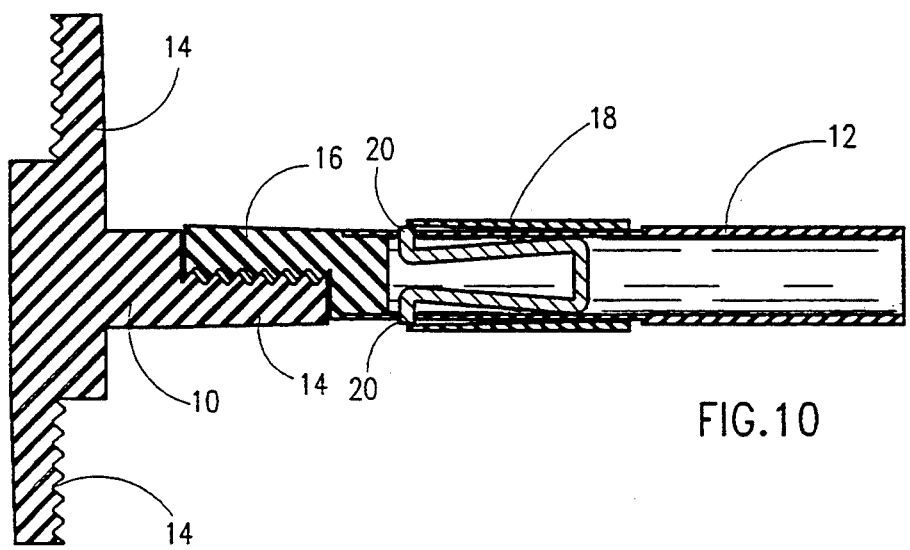
FIG. 10 is a plan cross sectional view corresponding to FIG. 7.
Figure 11:
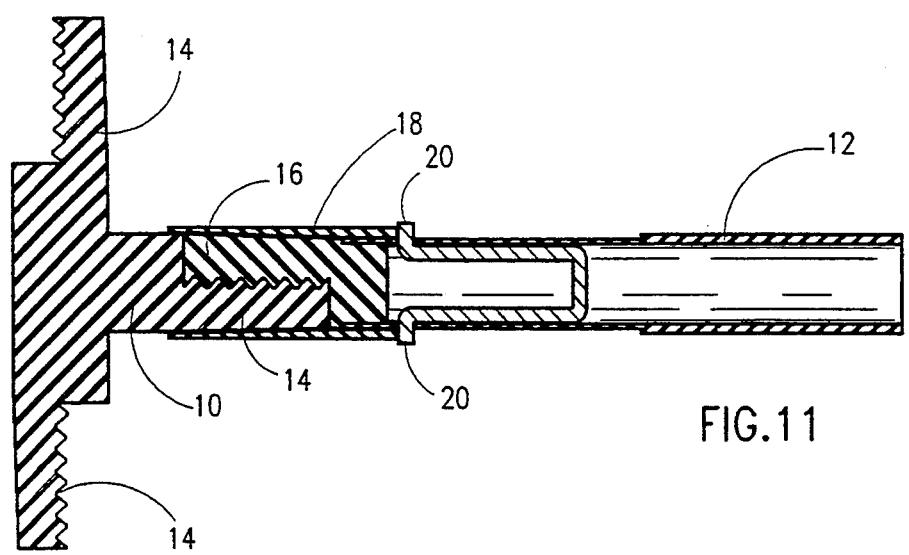
FIG. 11 is a plan cross sectional view corresponding to FIG. 8.

Shown in FIGS. 9-11 are cross sectional views corresponding to FIGS. 6-8. As can be seen in FIGS. 9-11, in a preferred embodiment of joint coupling according to the present invention, second complementary member 16 is an insert which is suitably connected to second joint 12. As can also be seen in FIGS. 9-11, in a preferred embodiment, a pair of connected depressible members 20 is employed. Preferably, depressible members 20 form portions of a single elastic member which serves to radially outwardly bias both depressible members 20. As can be seen in FIG. 9, depressible members 20 keep sleeve 18 from inadvertently sliding off second joint 12 when second joint 12 is not connected to first joint 10. As can be further seen in FIG. 11, depressible members 20 serve also to keep sleeve 18 from inadvertently sliding off the overlap region when the joint coupling is secured.

In a most preferred embodiment of a joint coupling according to the present invention, which is illustrated in FIGS. 9-11, the inside surfaces of sleeve 18 are suitably tapered, as are the outside surfaces of complementary members 14 and 16 in the overlap structure such that when sleeve 18 is slid completely over the overlap structure, inside surfaces of sleeve 18 make extensive contact with the outside surfaces of the overlap structure to firmly secure the joint coupling, which minimizes or eliminates any play or give in the coupling which would otherwise be present.

Typically, joints 10 and 12 are cylindrical in cross section, as are both the outside surfaces of complementary members 14 and 16 making up the overlap structure and the inside surfaces of sleeve 18.

In the highly preferred embodiment illustrated in FIGS. 9-11, both the outside surfaces of complementary members 14 and 16 making up the overlap structure and the inside surfaces of sleeve 18 are frusto-conically shaped and are matched to each other so that when sleeve 18 fully covers the overlap structure, contact is made between a significant fraction, preferably all, of the inside surfaces of sleeve 18 and a significant fraction, preferably all, of the outside surfaces of the overlap structure.

Figure 12:
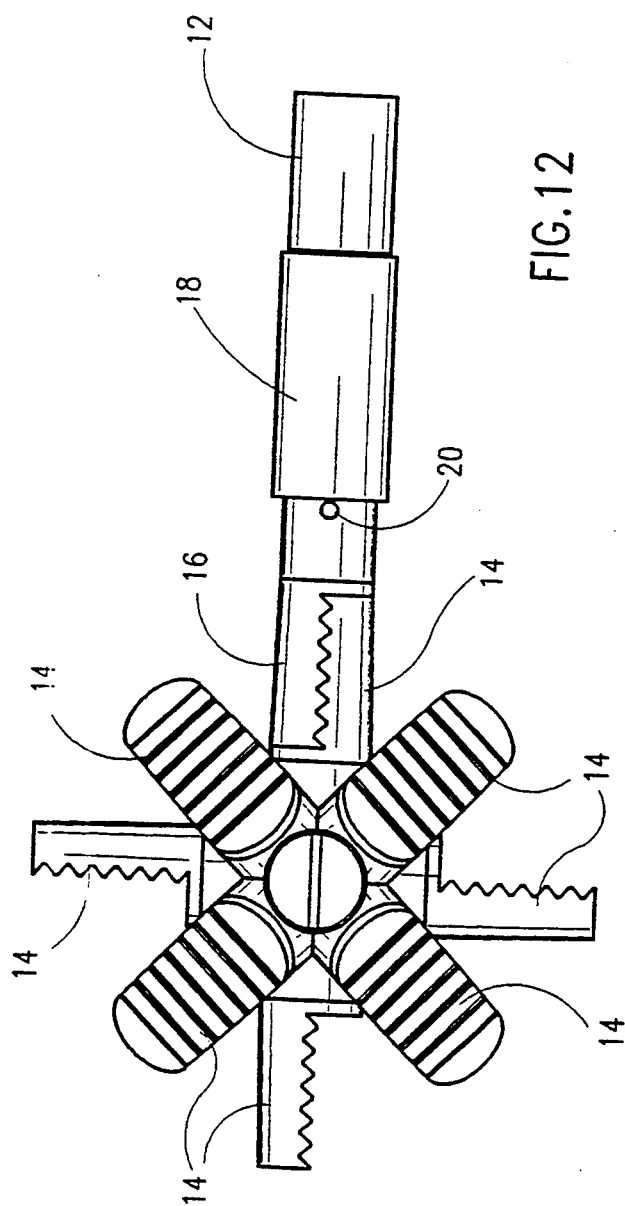
FIG. 12 shows a joint coupling according to the present invention and a hub for connecting several joints together.
Figure 14:
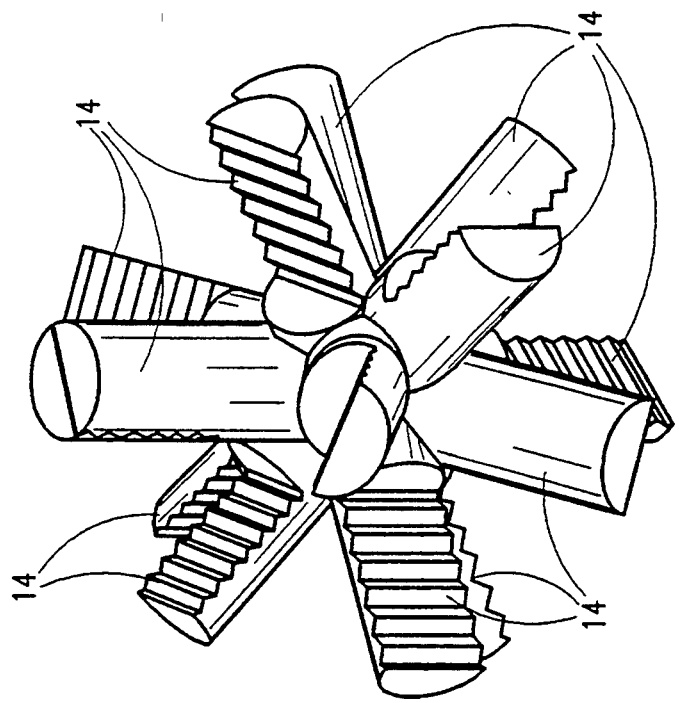
FIG. 14 shows yet another possible hub design.
Figure 13:
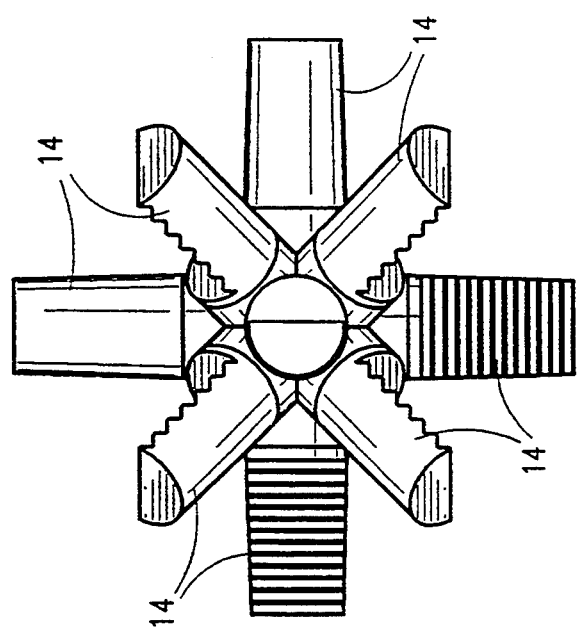
FIG. 13 shows another possible hub design.

As described above, first joint 10 may be a joint similar in length and function to second joint 14. Alternatively, first joint 10 may be a hub which includes two or more first complementary members 14. The hub illustrated in FIGS. 4-11 features three complementary members 14 oriented in the same plane and directed so that two of complementary members 14 share a common axis and the third is perpendicular to that axis. As will be readily appreciated, many other hubs may be envisioned which are designed to connect two or more joints in any desired angles. Three examples of such hubs are shown in FIGS. 12–14.

Joint couplings according to the present invention, especially when used with suitable hubs, are highly useful in forming a large variety of light yet strong structures, including, but not limited to, geodesic structures, building frames, children's climbing apparatus, and various temporary or permanent structures, such as tents, greenhouses, and the like. Other possible applications include the construction of rapidly assembled structures, bridges, stages, two-dimensional trusses, three-dimensional space frames, infinite polyhedral lattices, and the like.

While the invention has been described with respect to a limited number of embodiments, it will be appreciated that many variations, modifications and other applications of the invention may be made.

What is claimed is:

1. A joint coupling for axially connecting together a first joint and a second joint, comprising:
   (a) a first complementary member connected to, or integrally formed with, the first joint;
   (b) a second complementary member connected to, or integrally formed with, the second joint, said first mid second complementary members being sized and shaped so that, when properly aligned, said complementary members form an overlap structure which is effectively a continuation of the first joint or the second joint;
   (c) a sleeve slidable over said overlap structure so as to secure the joint coupling; and
   (d) a first depressible member and a second depressible member connected to, or integrally formed with, each other, said first and second depressible members being biased outwardly so as to prevent said sleeve from sliding off said second joint until the joint coupling is to be secured and to prevent said sleeve from sliding away from said overlap structure when the joint coupling is secured.

2. A joint coupling as in claim 1 wherein said sleeve has a tapered inside surface and wherein said overlap structure has a tapered outside surface such that when said sleeve is slid completely over said overlap structure, said inside surface of said sleeve makes contact with said outside surface of said overlap structure so as to secure the joint coupling.

3. A joint coupling as in claim 3 wherein said outside surface of said overlap structure and said inner surface of said sleeve are frusto-conical.

4. A joint coupling as in claim 1 wherein said overlap structure has a cylindrical outer surface and said sleeve has a cylindrical inner surface.

5. A joint coupling as in claim 1 wherein said first and second complementary members have surfaces which come in contact with each other when forming said overlap structure, said surfaces each including at least one protrusion and at least one recession.

6. A joint coupling as in claim 1 wherein said first and second complementary members have surfaces which come in contact with each other when forming said overlap structure, said surfaces each including a plurality of teeth.

* * * * *

UNITED STATES PATENT AND TRADEMARK OFFICE
CERTIFICATE OF CORRECTION

PATENT NO. : 5,439,309
DATED : Aug. 8, 1995
INVENTOR(S) : Danny RAZ

It is certified that error appears in the above-indentified patent and that said Letters Patent is hereby corrected as shown below:

Column 6, Line 18, replace "3" with --2--

Signed and Sealed this

Twenty-sixth Day of September, 1995

Attest:

BRUCE LEHMAN

*Attesting Officer*     *Commissioner of Patents and Trademarks*